United States Patent
Chen et al.

(10) Patent No.: US 8,134,541 B2
(45) Date of Patent: Mar. 13, 2012

(54) CAPACITIVE TOUCH PANEL

(75) Inventors: Jian-Ting Chen, Hsinchu (TW); Paul C.-P. Chao, Hsinchu (TW); Jyun-Yao Ruan, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 445 days.

(21) Appl. No.: 12/390,804

(22) Filed: Feb. 23, 2009

(65) Prior Publication Data

US 2010/0164901 A1 Jul. 1, 2010

(30) Foreign Application Priority Data

Dec. 30, 2008 (TW) ................................ 97151403 A

(51) Int. Cl.
*G06F 3/045* (2006.01)

(52) U.S. Cl. ....................... 345/174; 178/18.06; 345/173
(58) Field of Classification Search .................. 345/173, 345/174; 178/18.03, 18.06
See application file for complete search history.

(56) References Cited

U.S. PATENT DOCUMENTS

| | | | |
|---|---|---|---|
| 6,882,338 B2 * | 4/2005 | Flowers | 345/174 |
| 2005/0030048 A1 * | 2/2005 | Bolender et al. | 324/661 |
| 2010/0066701 A1 * | 3/2010 | Ningrat | 345/174 |

* cited by examiner

*Primary Examiner* — Adam R Giesy
(74) *Attorney, Agent, or Firm* — Muncy, Geissler, Olds & Lowe, PLLC

(57) ABSTRACT

A capacitive touch panel with particular conductive pattern design reduces the mutual interference between the upper and lower electrode and perform three-dimensional capacitance detection and double-faced detection, and may be applied in large dimension touch panel with high sensitivity.

14 Claims, 6 Drawing Sheets

CAPACITIVE TOUCH PANEL

BACKGROUND OF THE INVENTION

1. Field of the Invention

The present invention relates to a capacitive touch panel, and more particularly to a capacitive touch panel capable of performing three-dimensional capacitance detection.

2. Description of the Prior Art

Generally speaking, a capacitive touch panel is composed of a capacitance array and a capacitive sensor readout circuit. The conventional design for capacitance array includes a capacitance formed by conductive patterns on the upper surface and the lower surface of the touch panel, in which the conductive patterns on the upper surface are complementary to conductive patterns on the lower surface. The touch panel is operated via generating a capacitive effect as soon as a user's finger or a conductor touches and determining the position of the finger or the conductor by variance in capacitance values. The capacitive touch panel utilizes the variance in capacitance values to detect whether human touch is present or not.

Basically, capacitive touch panels differ in the capacitance values formed by various design patterns. Conventional arts achieve the maximum sensitivity for capacitance value by adopting opposite patterns on the upper and lower layers. In case of opposite patterns on the upper and lower layers, the maximum detecting sensitivity for vertical capacitance is achieved and accompanied with poorest horizontal capacitance detection, however. Hence, the conventional arts may only be used for vertical capacitance detection.

In addition, the touch panel adopting ITO (tin-doped indium oxide) wires increases its resistance value in direct ratio as the panel dimension increases. Also, patterns on the upper and lower surfaces are complementary for achieving the optimal detecting sensitivity; therefore, the touch panel may be not used for both sides, or otherwise, the sensitivity would decrease abruptly.

To sum up, it is highly desirable to develop a touch panel capable of performing double-faced detection and may be applied in large dimension touch panel with high sensitivity.

SUMMARY OF THE INVENTION

The present invention is directed to provide a capacitive touch panel including a conductive pattern design. The capacitive touch panel may reduce mutual interference between the upper and lower electrodes and may perform three-dimensional capacitance detection and double-faced detection, and may be applied in large dimension touch panel with high sensitivity.

According to an embodiment, a capacitive touch panel includes an insulating layer, a plurality of first dimensional conductive patterns, and a plurality of second dimensional conductive patterns. The first dimensional conductive patterns are configured over an upper surface of the insulating layer, wherein each of the first dimensional conductive patterns includes a first axis and a plurality of first conductive patterns configured to the first axis. Each of the first conductive patterns includes a pair of first inner protrusions extending bilaterally from the first axis and a pair of first outer protrusions extending from extremities of the first inner protrusions in an angle. The second dimensional conductive patterns are configured over a lower surface of the insulating layer, wherein each of the second dimensional conductive patterns includes a second axis rotated 90 degrees from the first axis and a plurality of second conductive patterns configured to the second axis. Each of the second conductive patterns includes a pair of second inner protrusions extending bilaterally from the second axis and a pair of second outer protrusions extending from extremities of the second inner protrusions in an angle. Each of the second conductive patterns is respectively configured at the relative position of each of the first conductive patterns on the lower surface of the insulating layer.

According to another embodiment, a capacitance detecting method using the aforementioned capacitive touch panel includes detecting a first dimensional capacitance value by defining any two adjacent first dimensional conductive patterns on the insulating layer as a driving electrode and a sensing electrode; detecting a second dimensional capacitance value by defining any two adjacent second dimensional conductive patterns on the insulating layer as a driving electrode and a sensing electrode; and detecting a third dimensional capacitance value by defining one of the first dimensional conductive patterns and second dimensional conductive patterns as a driving electrode and the other as a sensing electrode.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE EMBODIMENTS

Figure 1:
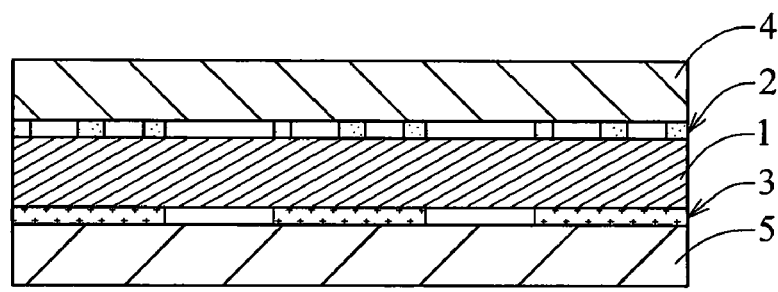
FIG. 1 is a sectional view diagram schematically illustrating a capacitive touch panel according to one embodiment of the present invention.

FIG. 1 is a sectional view diagram illustrating a capacitive touch panel according to one embodiment of the present invention. The capacitive touch panel includes an insulating layer 1, a plurality of first dimensional conductive patterns, e.g. column conductive patterns 2, and a plurality of second dimensional conductive patterns, e.g. row conductive patterns 3. The column conductive patterns 2 are configured over an upper surface of the insulating layer 1, and the row conductive patterns 3 are configured over a lower surface of the insulating layer 1. The capacitive touch panel also includes an upper insulating layer 4 configured over the column conductive patterns 2 and a lower insulating layer 5 configured over the row conductive patterns 3. The upper insulating layer 4 and the lower insulating layer 5 are used for reducing the possibility of wearing caused by, for example, human touch. The column conductive patterns 2 over the upper surface and the row conductive patterns 3 over the lower surface form a vertical capacitance, and an ideal capacitance value may be obtained by adjusting the insulating layer 1. In addition, the column conductive patterns 2 and the row conductive patterns 3 may form horizontal capacitances respectively to achieve better detecting sensitivity. Therefore, a human touch is sensed by detecting variance in capacitance values of the formed capacitance.

Figure 2:
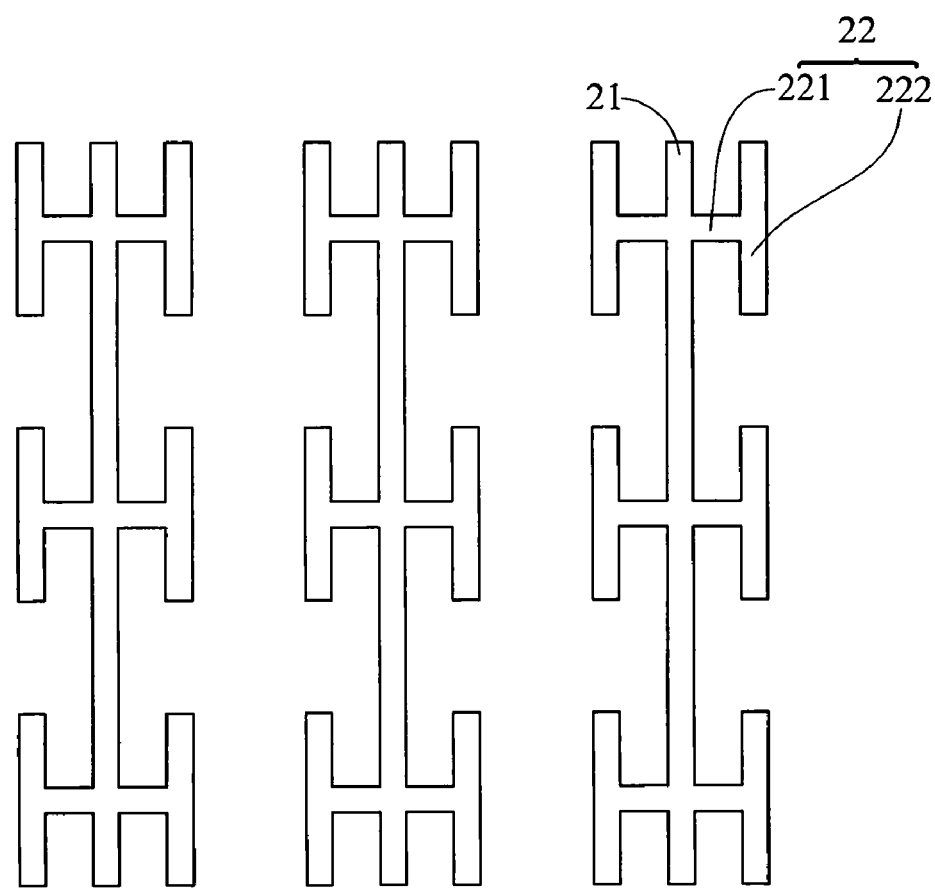
FIG. 2 is a top view diagram schematically illustrating column conductive patterns according to one embodiment of the present invention.

FIG. 2 is a top view diagram illustrating column conductive patterns according to one embodiment of the present invention. Each of the first dimensional conductive patterns includes a first axis, e.g. a column axis 21, and a plurality of first conductive patterns 22 configured to the column axis 21. Each of the first conductive patterns 22 includes a pair of first inner protrusions 221 extending bilaterally from the column axis 21 and a pair of first outer protrusions 222 extending from extremities of the first inner protrusions 221 at a predetermined angle. In the present embodiment, the first protrusions 222 bilaterally extend from the first inner protrusions 221, the adjacent first outer protrusions 222 in different columns are parallel to each other, and the first outer protrusions 222 are parallel to the column axis 21. Also, the first conductive patterns 22 may be configured as an array for even distribution.

Figure 3:
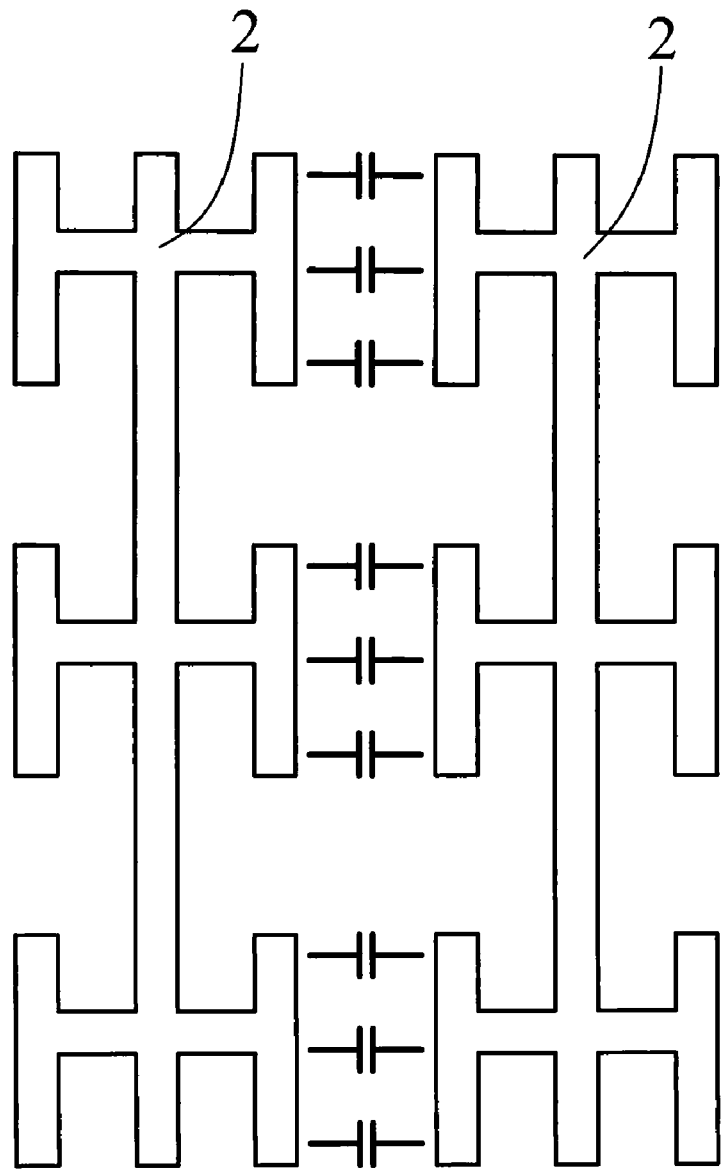
FIG. 3 is a top view diagram schematically illustrating a horizontal column capacitance detection scheme.

A method for capacitance detecting method using the capacitive touch panel is described below. First, referring to FIG. 3, which is a top view diagram illustrating a scheme for horizontal column capacitance detection. Any two adjacent column conductive patterns 2 form a capacitance. For a horizontal column capacitance detecting step, e.g. a first dimensional capacitance detecting step, to be subsequently performed, any two adjacent column conductive patterns 2 are defined as a driving electrode and a sensing electrode, respectively. To be specific, one column axis 21 is charged and defined as a driving electrode. As the driving electrode is charged, variance in capacitance values is detected at the other column axis 21 that is defined as a sensing electrode to obtain a horizontal column capacitance value.

Figure 4A:
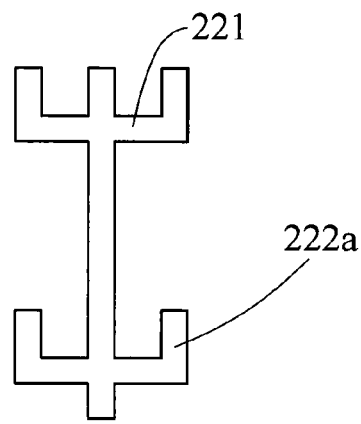
FIG. 4a to FIG. 4c are top view diagrams schematically illustrating examples of the first conductive patterns of the present invention.
Figure 4B:
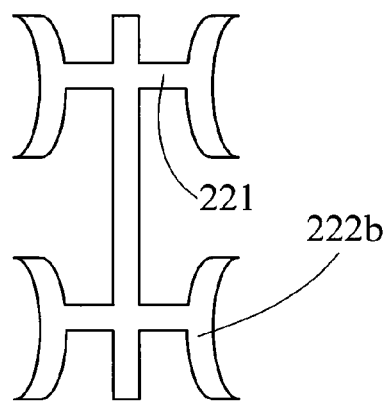
Figure 4C:
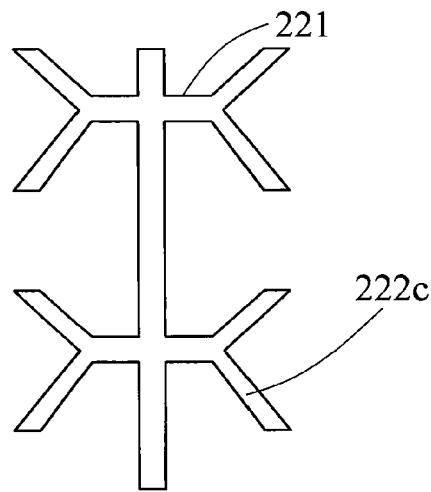

FIG. 4a to FIG. 4c are top view diagrams illustrating examples of the first conductive patterns according to an embodiment of the present invention. First, a first outer protrusion 222a may extend from only one side extremity of the first inner protrusion 221. A first outer protrusion 222b may be arc-shaped and configured at the extremity of the first inner protrusion 221. In addition, the first outer protrusion 222c may be obliquely configured at the extremity of the first inner protrusion 221 to form a capacitance with fixed distance.

Figure 5:
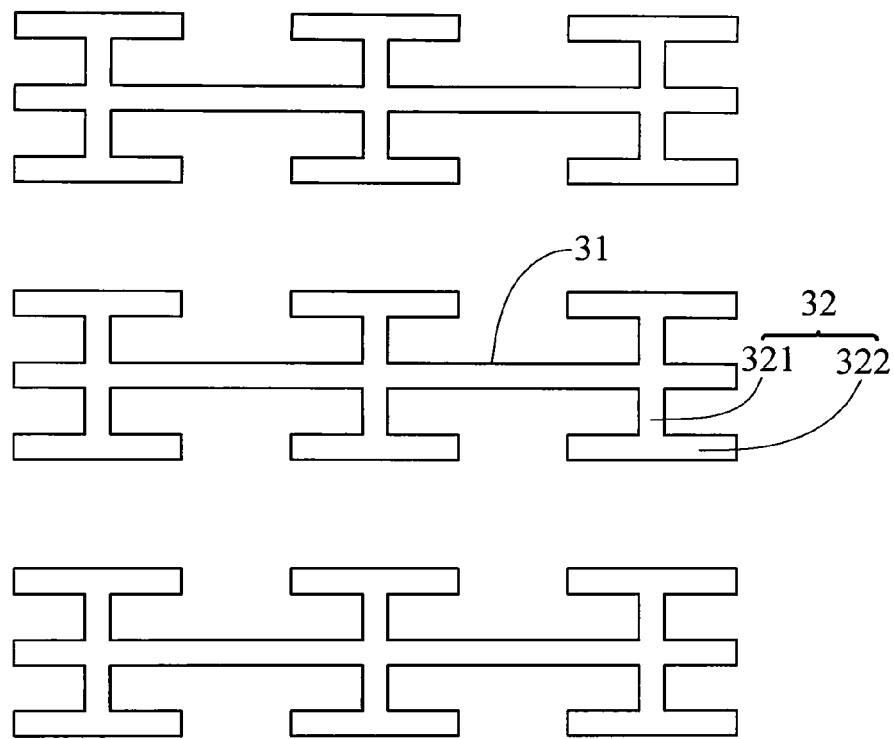
FIG. 5 is a top view diagram schematically illustrating row conductive patterns according to one embodiment of the present invention.

FIG. 5 is a top view diagram illustrating row conductive patterns according to one embodiment of the present invention. Each of the second dimensional conductive patterns, e.g. the row conductive patterns 3, includes a second axis, e.g. a row axis 31, and a plurality of second conductive patterns 32 configured to the row axis 31. Each of the second conductive patterns 32 includes a pair of second inner protrusions 321 extending bilaterally from the row axis 31 and a pair of second outer protrusions 322 extending from extremities of the second inner protrusions 321 at a predetermined angle. Here, each of the second conductive patterns 32 is respectively configured at the relative positions of each of the first conductive patterns 22 (as illustrated in FIG. 2) on the lower surface of the insulating layer 1. In the present embodiment, the second protrusions 322 bilaterally extend from the second inner protrusions 321, the adjacent second outer protrusions 322 in different rows are parallel to each other, and the second outer protrusions 322 are parallel to the row axis 31. Also, the second conductive patterns 32 may be configured as an array for even distribution.

Figure 6:
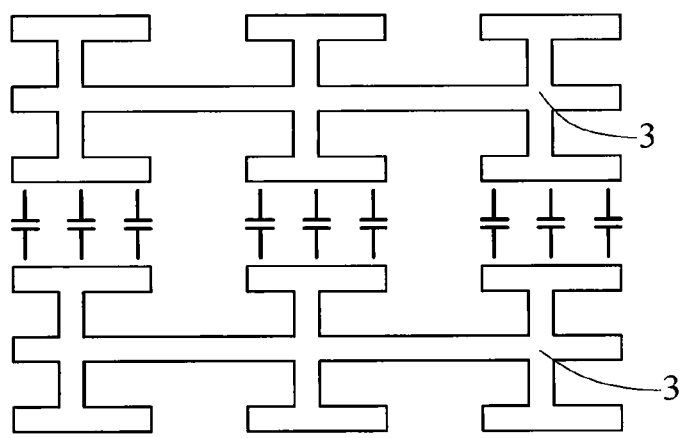
FIG. 6 is a top view diagram schematically illustrating a horizontal row capacitance detection scheme.

Next, referring to FIG. 6, a top view diagram illustrating a horizontal row capacitance detection scheme is illustrated. Any two adjacent row conductive patterns 3 form a capacitance. For a horizontal row capacitance detecting step, e.g. a second dimensional capacitance detecting step, to be subsequent performed, any two adjacent row conductive patterns 3 are defined as a driving electrode and a sensing electrode, respectively. To be specific, one row axis 31 is charged and defined as a driving electrode. As the driving electrode is charged, variance in capacitance values is detected at the other row axis 31 that is defined as a sensing electrode to obtain a horizontal row capacitance value.

Figure 7A:
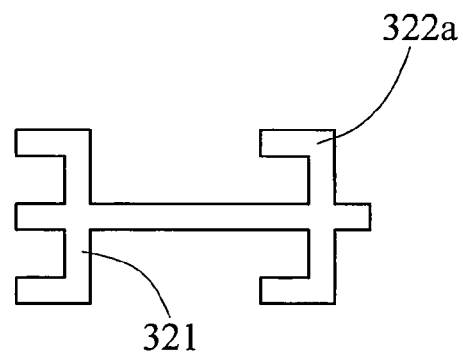
FIG. 7a to FIG. 7c are top view diagrams schematically illustrating examples of the second conductive patterns of the present invention.
Figure 7B:
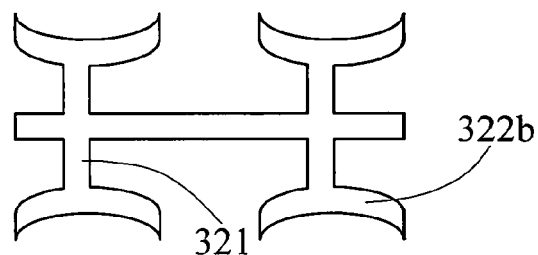
Figure 7C:
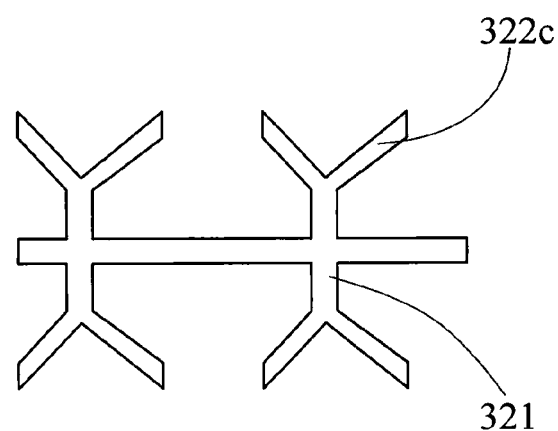

FIG. 7a to FIG. 7c are top view diagrams illustrating examples for the first conductive patterns of the present invention. First, a second outer protrusion 322a may extend from only one extremity side of the second inner protrusion 321. A second outer protrusion 322b may be arc-shaped and configured at the extremity of the second inner protrusion 321. In addition, the second outer protrusion 322c may be obliquely configured at the extremity of the second inner protrusion 321 to form a capacitance with fixed distance.

It is noted that the column conductive patterns and the row conductive patterns are relative positioned representing first dimensional conductive patterns and second dimensional conductive patterns. The column conductive patterns and the row conductive patterns are interchangeable; i.e. either of the column conductive patterns and the row conductive patterns may be configured over the upper surface, or the column conductive patterns and the row conductive patterns are configured over the upper and lower surface in an interchangeable manner.

In addition, due to the relative configuration of the column conductive patterns and the row conductive patterns, it may achieve the same purpose by using either the upper surface side or the lower surface side. That is to say, the capacitive touch panel describe above may be applied for double-faced detection.

Figure 8:
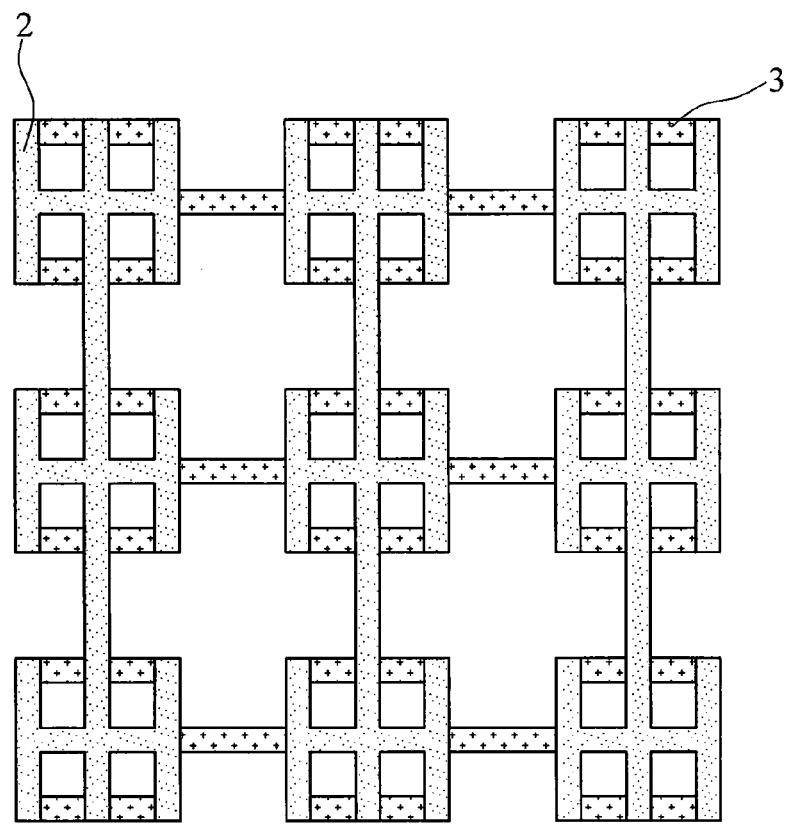
FIG. 8 is a top view diagram schematically illustrating a vertical capacitance detection scheme according to one embodiment of the present invention.

FIG. 8 is a top view diagram illustrating a vertical capacitance detection scheme according to one embodiment of the present invention. In one embodiment, the row conductive patterns 3 are obtained from 90 degrees rotation of the column conductive patterns 2; therefore, the column conductive patterns 2 and the row conductive patterns 3 are complementary, and a vertical capacitance with the same detecting sensitivity as conventional arts is hence obtained. Furthermore, a vertical capacitance detecting step, e.g. a third dimensional capacitance detecting step, is then performed for obtaining a third dimensional capacitance value by defining one of the column conductive patterns 2 and the row conductive patterns 3 as a driving electrode and the other as a sensing electrode. To be specific, one column conductive pattern 2 is charged and defined as a driving electrode. As the driving electrode is charged, variance in capacitance values is detected at the other one of row conductive patterns 3 that is defined as a sensing electrode, or vice versa, to obtain a vertical capacitance value.

A touch position may be obtained by the aforementioned vertical capacitance detecting step and further verified with assistance of the feedback of the position obtained by the aforementioned horizontal column capacitance detecting step and horizontal row capacitance detecting step.

Still referring to FIG. 8, the column conductive patterns 2 over the upper surface do not fully mask the row conductive patterns 3 over the lower surface; therefore, the capacitive touch panel of the present invention is more transparent compared to the conventional arts. In addition, the horizontal row capacitance detecting step using the row conductive patterns 3 on the lower surface may not be affected by the column conductive patterns 2 on the upper surface.

Figure 9:
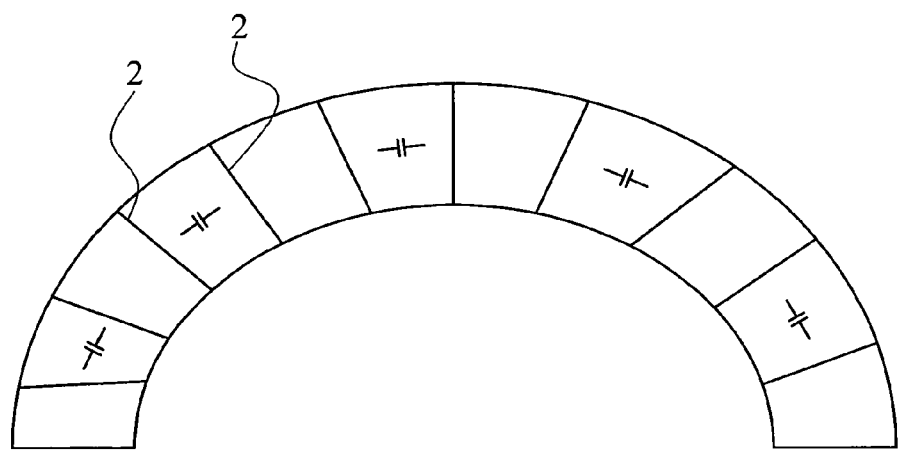
FIG. 9 is a top view diagram schematically illustrating a flexible capacitive touch panel.

FIG. 9 is a top view diagram illustrating a flexible capacitive touch panel. The insulating layer is resilient so that the touch panel is also flexible. Here, the resilient effect changes the distance between the horizontal column conductive patterns 2, and horizontal column capacitance detection is performed to obtain the extent of flexibility. A compensation step for detection circuit and touch position is then performed for achieving more precise touch point.

Now referring to FIG. 1 again, the insulating layer 1, the column conductive patterns 2 and the row conductive patterns 3 configured over the upper surface of the insulating layer 1 form a vertical capacitance, and an ideal capacitance value may be obtained by adjusting the insulating layer 1. In addition, the column conductive patterns 2 and the row conductive patterns 3 may form horizontal capacitances respectively to achieve better detecting sensitivity. Therefore, a human touch is sensed by detecting the variance in capacitance values of the formed capacitance.

To sum up, a capacitive touch panel and a detecting method thereof including a conductive pattern design may reduce the mutual interference between the upper and lower electrode and may be capable of performing three-dimensional capacitance detection and double-faced detection, and may be applied in large dimension touch panel with high sensitivity.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A capacitive touch panel, comprising:
   an insulating layer;
   a plurality of first dimensional conductive patterns configured over an upper surface of the insulating layer, wherein each of the first dimensional conductive patterns comprises a first axis and a plurality of first conductive patterns configured to the first axis, and each of the first conductive patterns comprises:
   a pair of first inner protrusions extending bilaterally from the first axis; and
   a pair of first outer protrusions extending from extremities of the first inner protrusions at a predetermined angle; and
   a plurality of second dimensional conductive patterns configured on a lower surface of the insulating layer, wherein each of the second dimensional conductive patterns comprises a second axis rotated 90 degrees from first axis and a plurality of second conductive patterns configured to the second axis, and each of the second conductive patterns comprises:
   a pair of second inner protrusions extending bilaterally from the second axis; and
   a pair of second outer protrusions extending from extremities of the second inner protrusions at a predetermined angle, wherein each of the second conductive patterns is respectively configured at positions corresponding to the first conductive patterns over the lower surface of the insulating layer, wherein a first dimensional capacitance is formed by any two adjacent first dimensional conductive patterns on the insulating layer as a first driving electrode and a first sensing electrode;
   a second dimensional capacitance is formed by any two adjacent second dimensional conductive patterns on the insulating layer as a second driving electrode and a second sensing electrode; and
   a third dimensional capacitance is formed by one of the first dimensional conductive patterns and second dimensional conductive patterns as a third driving electrode and a third sensing electrode.

2. The capacitive touch panel as claimed in claim 1, wherein the first conductive patterns are configured as an array.

3. The capacitive touch panel as claimed in claim 1, wherein the second conductive patterns are configured as an array.

4. The capacitive touch panel as claimed in claim 1, wherein the first outer protrusions bilaterally extend from extremities of the first inner protrusions.

5. The capacitive touch panel as claimed in claim 1, wherein the second outer protrusions bilaterally extend from extremities of the second inner protrusions.

6. The capacitive touch panel as claimed in claim 1, wherein adjacent first outer protrusions in different first axes are parallel to each other.

7. The capacitive touch panel as claimed in claim 1, wherein adjacent second outer protrusions in different second axes are parallel to each other.

8. The capacitive touch panel as claimed in claim 1, wherein the first outer protrusion is parallel to the first axis.

9. The capacitive touch panel as claimed in claim 1, wherein the second outer protrusion is parallel to the second axis.

10. The capacitive touch panel as claimed in claim 1, wherein the second dimensional conductive patterns are obtained from 90 degrees rotation of the first dimensional conductive patterns.

11. The capacitive touch panel as claimed in claim 1 further comprising an upper insulating layer configured over the first dimensional conductive patterns.

12. The capacitive touch panel as claimed in claim 1 further comprising a lower insulating layer configured over the second dimensional conductive patterns.

13. The capacitive touch panel as claimed in claim 1, wherein the insulating layer is resilient.

14. A capacitance detecting method using the capacitive touch panel as claimed in claim 1, comprising:
   detecting a first dimensional capacitance value of the first dimensional capacitance;
   detecting a second dimensional capacitance value of the second dimensional capacitance; and
   detecting a third dimensional capacitance value of the third dimensional capacitance.

* * * * *